United States Patent [19]

Collins

[11] Patent Number: 5,228,424
[45] Date of Patent: Jul. 20, 1993

[54] POSITIVE CRANKCASE VENTILATION VALVE

[76] Inventor: Gregorio S. Collins, 6324 85th Pl., Apt. 304, Los Angeles, Calif. 90045

[21] Appl. No.: 860,182

[22] Filed: Mar. 30, 1992

[51] Int. Cl.⁵ ............................................ F02B 25/06
[52] U.S. Cl. ................................................ 123/574
[58] Field of Search ............................ 123/572, 574

[56] References Cited

U.S. PATENT DOCUMENTS

| | | | |
|---|---|---|---|
| 2,489,230 | 11/1949 | Winkler | 123/572 |
| 3,091,229 | 5/1963 | Nevin | 123/572 |
| 3,105,477 | 10/1963 | Lowther | 123/572 |
| 3,164,141 | 1/1965 | Jones | 123/574 |
| 3,165,097 | 1/1965 | Lowther | 123/572 |
| 3,437,082 | 4/1969 | Bouwkamp et al. | 123/572 |
| 3,450,114 | 6/1989 | Miles | 123/572 |
| 3,495,578 | 5/1968 | Guarnaschelli | 123/574 |
| 3,587,542 | 6/1971 | Miles | 123/572 |
| 3,645,242 | 2/1972 | Horiuchi | 123/572 |
| 3,673,994 | 7/1972 | Aono | 123/574 |
| 3,880,130 | 4/1975 | Hecht | 123/572 |
| 4,158,353 | 6/1979 | Darnell | 123/572 |
| 4,245,592 | 1/1981 | Atkins, Sr. | 123/572 |
| 4,686,952 | 8/1987 | Ziegler, Jr. et al. | 123/572 |
| 4,856,487 | 8/1989 | Furuya | 123/574 |
| 4,886,033 | 12/1989 | Betterton et al. | 123/574 |
| 4,905,656 | 3/1990 | Betterton et al. | 123/574 |
| 4,905,657 | 3/1990 | Betterton et al. | 123/574 |

*Primary Examiner*—Noah P. Kamen
*Attorney, Agent, or Firm*—Harness, Dickey & Pierce

[57] ABSTRACT

A two stage valve for regulating the ventilation of gases from the crankcase of an internal combustion engine, where the flow of gases from the crankcase through the valve and into the intake manifold is limited whenever engine loads are relatively low regardless of engine vacuum and where the flow of gases from the crankcase through the valve and into the intake manifold is relatively large whenever engine loads are relatively large.

14 Claims, 3 Drawing Sheets

POSITIVE CRANKCASE VENTILATION VALVE

BACKGROUND OF THE INVENTION

This invention relates generally to the field of emissions control for internal combustion engines, and more particularly to a positive crankcase ventilation valve (PCV valve) for reducing blow-by gases.

In a four-stroke internal combustion engine, lubrication is provided to the pistons within the cylinders by way of the crankcase. The piston rings serve to seal the cylinder chamber from the crankcase as the piston travels up and down. Of course, a perfect seal can never be obtained. As a result, oil from the crankcase intended for use in lubricating the cylinder gets drawn into the combustion chamber and burned during the combustion process. Also, combustion waste gases can escape past the piston rings into the crankcase. The phenomena of waste gases entering into the crankcase is commonly referred to as "blow-by". Because of blow-by, the concentration of hydrocarbon waste gases in the crankcase is often several times that of the concentration of hydrocarbons in the intake manifold. The presence of hydrocarbon gases in the crankcase presents a dilemma: if the gases are freely discharged into the atmosphere, the hydrocarbon waste gases contribute to urban pollution; however, if the waste gases remain trapped in the crankcase, the gases contaminate the lubricating oil and result in degraded oil performance, i.e. the contaminated oil does not lubricate as well as it should, contributing to unnecessary wear of the piston rings which subsequently reduces their ability to seal properly. Thus, it can be seen that a vicious cycle is established: imperfections in the piston rings that allow engine oil to be burned in combustion also allow blow-by gases to enter the crankcase and contaminate the oil; this contributes to degraded oil lubricating performance which increases piston ring wear, thus increasing the amount of oil allowed to burn in the combustion process and increasing the amount of blow-by gases that enter the crankcase, which further contaminates the oil, etc. Yet, because of concerns over urban pollution, simply venting the blow-by gases from the crankcase directly to the atmosphere is unacceptable.

To solve this problem, valves have been introduced for recirculating the blow-by gases from the crankcase into the intake manifold where the gases are re-burned during combustion. These valves, known as positive crankcase ventilation (PCV) valves, rely on differentials in pressure between the crankcase and the intake manifold to draw the blow-by gases from the crankcase into the intake manifold.

Because air is drawn into the cylinder combustion chamber through the intake valve as the piston travels downward, the air pressure within the intake manifold is lower than that of the surrounding ambient atmosphere. This is commonly referred to as "engine vacuum". The amount of vacuum varies according to the load upon the engine. When the engine is running at essentially a constant speed, a higher degree of vacuum is present than when the engine is under a loaded condition, such as when accelerating or climbing a hill.

Since the purpose of the PCV valve is to vent blow-by gases from the crankcase into the intake manifold, it can be appreciated that the reciprocal of this goal is that no gases from the intake manifold be allowed to enter the crankcase. Thus, most PCV valves known to date operate similar to a check valve: allowing blow-by gases to be drawn from the crankcase into the intake manifold while preventing gases from the intake manifold to be drawn into the crankcase. One common way to implement such a check valve is to provide for a normally closed spring biased valve. At rest, a spring holds an valve member, such as a ball or disk, over an orifice thereby occluding the flow of gases through the orifice. When the air pressure is greater on the valve member than the spring force, the spring is compressed and the valve member is unseated from the orifice, allowing gases to flow.

While it is ultimately the differential in pressure between the intake manifold and the crankcase that allows blow-by gases to be drawn from the crankcase through the PCV valve and into the intake manifold, the fact that engine vacuum varies as a function of engine load rather than engine speed means that blow-by gases will not always be properly vented when using a simple check valve type design. For example, as was discussed earlier, engine vacuum is higher when engine speed remains relatively constant. Thus, there is essentially the same amount of vacuum present when the engine is idling (approximately 800 rpm) as when the engine is at a highway cruising speed (approximately 2400 to 3000 rpm). However, it can be appreciated that greater amounts of waste gases are being generated at 2400 rpm than at 800 rpm. Similarly, when the engine is being loaded as occurs during acceleration or hill climbing, engine vacuum decreases and waste gases increase. Thus, relying solely on intake vacuum to vent crankcase gases, a choice must be made between providing too much ventilation at engine idle or providing too little ventilation at higher engine speeds or during loaded engine conditions and thereby risking oil contamination by the blow-by gases.

SUMMARY OF THE INVENTION

It is therefore an object of the present invention to provide for a valve for regulating crankcase ventilation in which the intake orifice of the valve is selectively occluded to regulate the flow of gases between the crankcase and the intake manifold. In the preferred embodiment of the invention, the intake orifice is selectively occluded by two disks. The first disk is disposed between the second disk and the orifice, and has vents in its surface. The second disk is normally held against the first disk, resulting in both disks being held against the orifice. When no vacuum is present, the second disk contacts the first disk and fully occludes the vents in the first disk, and the first disk contacts the orifice, with the net result being the orifice is fully occluded. The presence of engine vacuum serves to urge the disks against the force of the spring, moving the disks away from the orifice and allowing gases to flow from the crankcase into the intake manifold. In order to compensate for the fact that fewer blow-by gases are created when the engine is idling than are created when the engine is loaded or when cruising at a constant yet higher speed, the first disk is held to partially occlude the orifice whenever the throttle position indicates the engine is operating at a low, constant speed (e.g., when idling).

BRIEF DESCRIPTION OF THE DRAWINGS

The features and advantages of the present invention can be better understood by referencing the description of the presently preferred embodiment in conjunction with the drawings in which.

DESCRIPTION OF THE PRESENTLY PREFERRED EMBODIMENT

Figure 1:
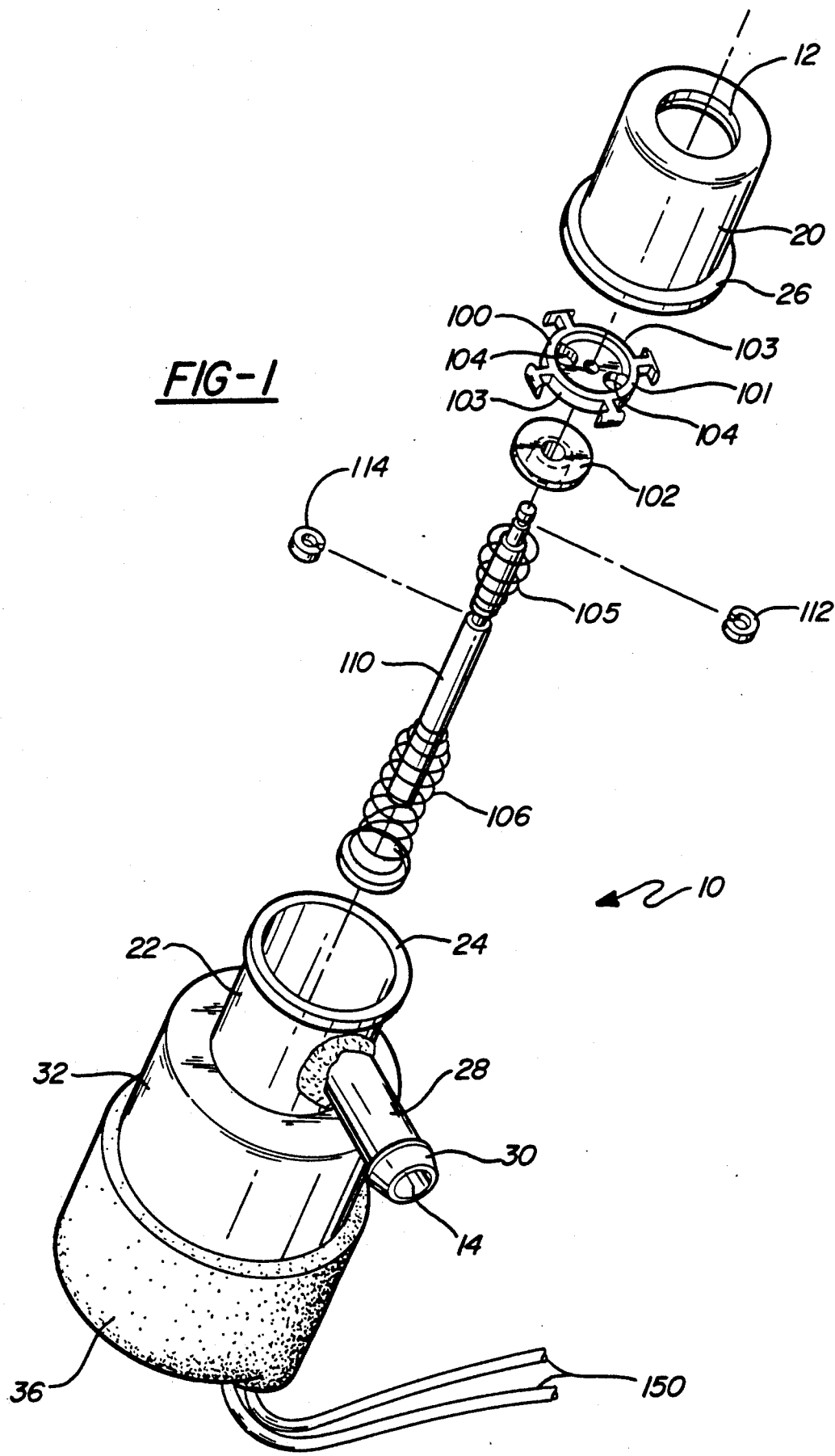
FIG. 1 is an exploded view detailing the various components that comprise the valve of the presently preferred embodiment.

The positive crankcase ventilation (PCV) valve of the presently preferred embodiment regulates the ventilation of crankcase gases from the crankcase into the intake manifold of an internal combustion engine, such as used in automotive vehicles. More particularly, the valve 10, as detailed in exploded view FIG. 1, has an intake orifice 12 connected by way of a suitable conventional means such as a tube and fitting (not shown) to the crankcase. An exhaust orifice 14 is connected to the intake manifold by similar suitable conventional means. Crankcase gases are drawn from the crankcase into the intake orifice 12 of the valve 10 and vented to the intake manifold by way of the valve's exhaust orifice 14. The flow of gases through the valve 10 is regulated by the valve's internal mechanism, the workings of which are the subject of this invention.

The PCV valve 10 is encased in a housing having an end cap 20 where the intake orifice 12 is formed. The housing also has a midportion 22 having a flange 24 over which a lip 26 formed in the end cap 20 is crimped to attach the end cap 20 to the midportion 22. The housing midportion 22 also has an exhaust tube 28 extending radially therefrom, the exhaust tube 28 having a nippled flange 30 surrounding the orifice for attaching the PCV valve exhaust pipe 28 to the engine's intake manifold in a conventional manner. At the other end of the housing is a solenoid housing 32 attached to the housing midportion 22 by way of a threaded guide 34 cooperating with a nut 35, which can be best seen in FIGS. 2 through 4. A rubber boot 36 fits over solenoid housing 32 to provide a weather-resistant cover.

Engine vacuum present in the intake manifold causes crankcase blow-by gases to be drawn from the crankcase, through the PCV valve intake orifice 12, into the PCV valve, out of the PCV valve 10 by way of the exhaust orifice 14, and into the intake manifold. However, the flow of crankcase gases through the PCV valve is regulated by the internal mechanism of the valve to provide for a lower degree of venting when the engine is idling (even though manifold vacuum may be very high) and to provide for a higher degree of venting when the engine is loaded or when the engine is cruising at a high speed. More particularly, the flow of crankcase gases through the PCV valve 10 is regulated by way of a first disk 100 and second disk 102. The first disk 100 has a star-shaped circular appearance, having four peripheral vents 103 along the outer circumference of the disk. The second disk 102 is of a smaller diameter than the first disk 100. The first disk 100 has a raised circular seat 101 with a diameter equivalent to the diameter of the intake orifice 12 such that when the first disk 100 is held against the orifice 12, only that portion of the disk inside the raised seat 101 is exposed. The peripheral vents 103 in the first disk 100 allow gases to flow around the outer periphery of the first disk 100 when the disk's raised seat 101 is unseated from the orifice 12. The first disk 100 also has two circular vents 104 located along the interior region inside of the raised seat's circumference. Gases can flow through these circular vents 104 even when disk 100 is seated on orifice 12. The second disk 102 is of such a diameter as to occlude the circular vents 104 when it is pressed against the first disk, but is sufficiently smaller than the diameter of the first disk so as not to occlude the peripheral vents 103.

Figure 2:
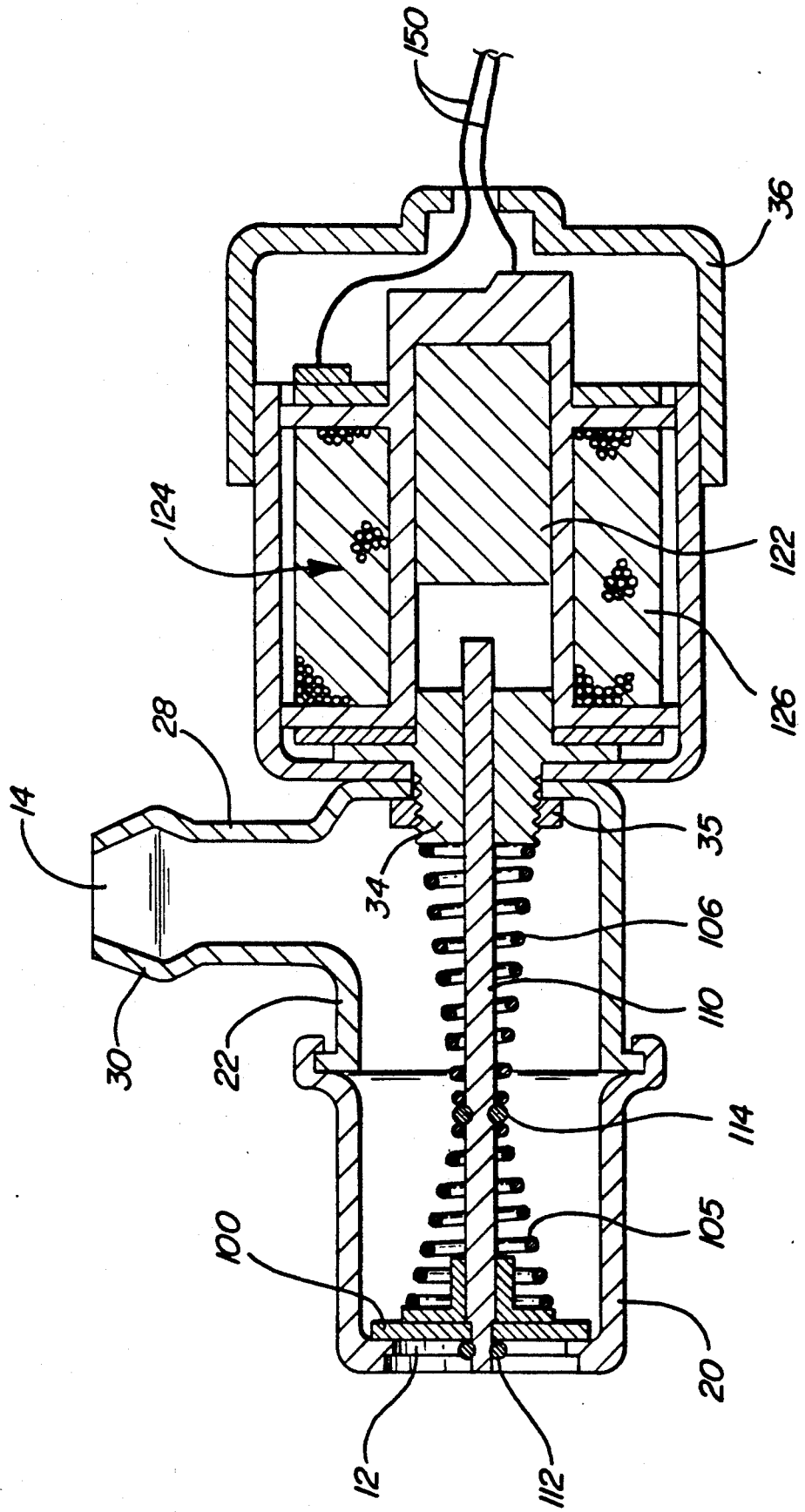
FIG. 2 is a longitudinal sectional view detailing the arrangement of the first and second disks when the engine is off.
Figure 3:
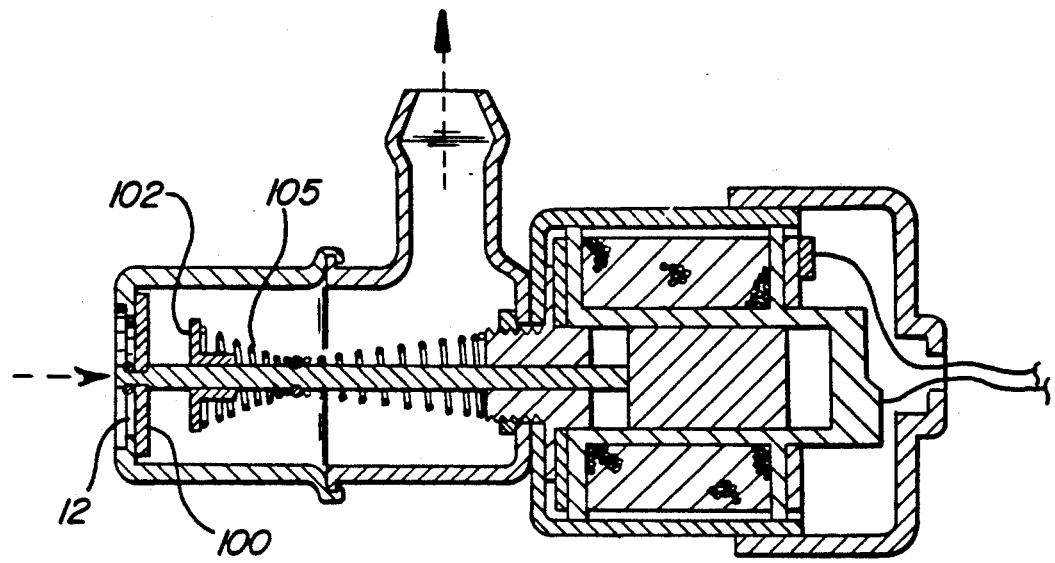
FIG. 3 is a longitudinal sectional drawing illustrating the position of the first and second disks when the engine is idling.

The first and second disks 100 and 102 are supported by a guide rod 110 and are normally biased against the intake orifice 12 by a first compression spring 105 and a second compression spring 106. Spring 105 is compressed between disk 102 and a snap ring 114 on rod 110, and spring 106 is compressed between guide 34 and snap ring 114. Thus, both rod 110 and disk 102 are biased toward orifice 12 to close same. The disks 100 and 102 are retained on a guide rod 110 by way of a first snap ring 112 so that the force of the first spring 105 does not cause the disks to become disengaged from the guide rod 110. Disk 100 is held fixed in position on rod 110 by a suitable shoulder on the latter, the disk 102 has an integral hub 103 and is free to slide on rod 110. The guide rod 110 is slidingly disposed in a bore through guide 34 and is connected to a plunger 122 within a solenoid 124 disposed within housing 32. When the solenoid 124 is deenergized, the plunger 122 and rod 110 are free to move between the positions shown in FIGS. 2 and 4, respectively, subject to the pressure differential across disks 100 and 102. When the solenoid 124 is energized, plunger 122 is urged to the left as shown in FIG. 3 by the electromagnetic forces created by the coils 126 of the solenoid to keep disk 100 seated on orifice 12 without regard to the aforesaid pressure differential. Disk 102, however, is still free to move away from the orifice 12 provided there is enough pressure differential across disk 102 to overcome the force of spring 105. The solenoid coils 126 are electrically connected to an electrical activation signal by way of connector wires 150.

Figure 5:
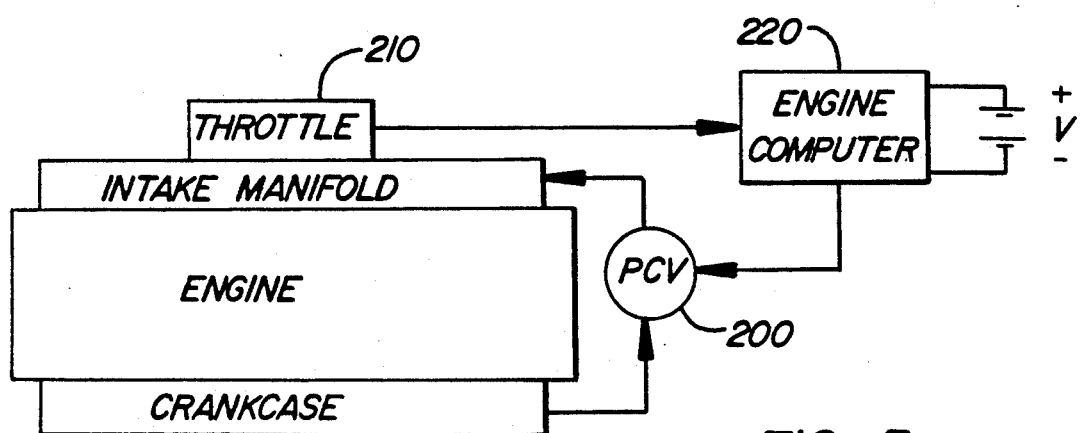
FIG. 5 is a functional diagram of the operation of the valve.

In the presently preferred embodiment, the solenoid is selectively actuated based upon engine throttle position. As illustrated in the functional block diagram of FIG. 5, the PCV valve 200 and throttle 210 are part of an open control loop. When the throttle position is low, this generally corresponds to a situation where the engine is idling or cruising at a relatively low speed. Similarly, the throttle is in a higher position when the engine is being accelerated or when the engine is cruising at a higher, constant rate of speed. Thus, for the purposes of this embodiment, the throttle position provides a convenient means by which to determine whether the engine is idling or whether it is accelerating or operating at a constant high speed. However, it can be appreciated that other means of determining engine speed and load could be utilized. Furthermore, the determination of throttle position can be accomplished in a number of ways. For example, as illustrated in FIG. 5, a signal could be accessed from the engine computer 220 commonly used to control ignition and spark advance, since throttle position is a control parameter frequently used in engine computers. Similarly, a mechanical position sensor could be utilized, such as a limit switch or potentiometer. Thus, it can be appreciated that the particular signals used to selectively activate the solenoid are not so critical as is the mere fact that the actuating signal must somehow distinguish an idle condition from a high constant speed condition.

In operation, the PCV valve of the presently preferred embodiment regulates the flow of crankcase gases from the crankcase into the intake manifold of the internal combustion engine by selectively occluding the gas flow. As shown in FIG. 2, when no engine vacuum is present (such as when the engine is off), the bias of springs 105 and 106 holds the first and second disks 100 and 102 against intake orifice 12. The seat 101 of the first disk 100 seats against the edge of the orifice and the second disk 102 contacts the first disk 100 and blocks vents 104, thereby occluding any flow of gases from the crankcase into the intake manifold.

When the engine is idling, as shown in FIG. 3 (this condition sensed using the throttle or other suitable means, aforesaid) solenoid 124 is energized so that the first disk 100 is forced against the intake orifice 12. However, because engine vacuum is present, disk 102 is urged away from the intake orifice against the tension of spring 105 by the resulting pressure differential so as to allow a partial flow of gases from the crankcase into the intake manifold through vents 104. The fact that the first disk 100 is still seated against the intake orifice 12 guarantees that the flow rate of the gases will remain restricted. The peripheral vents 103 are ineffective because the first disk 100 is seated against the orifice along its raised seat 101. This partially restricted flow rate provides the proper degree of crankcase ventilation at idle and low engine speed without unduly depleting engine manifold vacuum.

Figure 4:
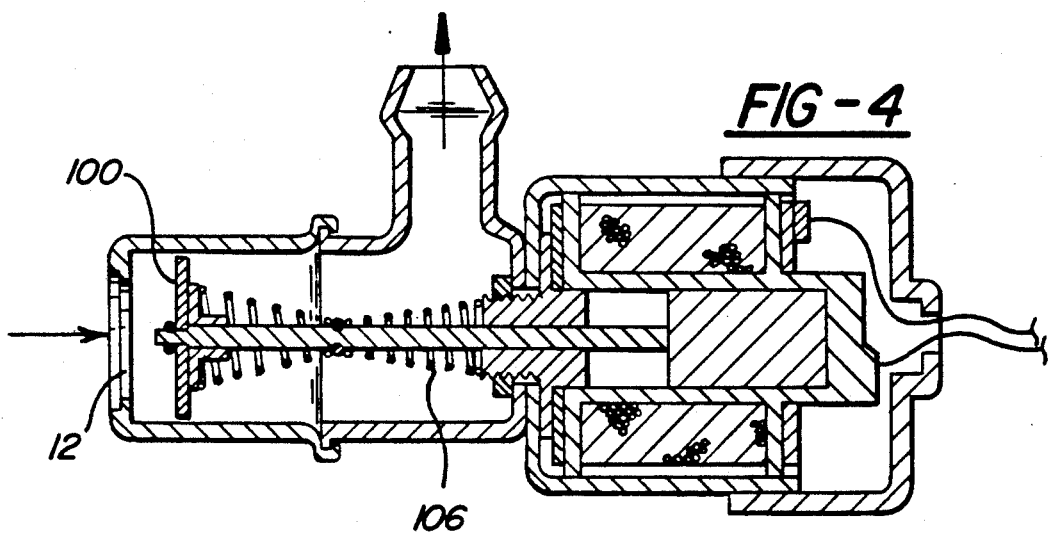
FIG. 4 is a longitudinal sectional drawing illustrating the position of the first and second disks when the engine is both under a load situation, such as when accelerating or climbing a hill, or when the engine is cruising at a constant, higher speed.

Finally, as shown in FIG. 4, an unrestricted flow of crankcase gases is allowed when the engine is loaded (such as when accelerating or climbing a hill) and when the engine is cruising at a high, constant speed. To allow the unrestricted venting of crankcase gases, the solenoid 124 is deactivated so that the vacuum force from the intake manifold is able to urge both first and second disks 100 and 102 away from intake orifice 12. When operating in this mode, spring 106 provides the primary resistance to the movement of disks 100 and 102. Crankcase gases now flow around the unseated first disk 100 by way of the peripheral vents 103, which allow for a higher flow rate than that of vents 104. By allowing both disks to be urged away from the intake orifice, this third mode of operation provides for the proper degree of ventilation when the engine is loaded.

Furthermore, by ensuring the venting of crankcase gases into the intake manifold are properly regulated, fouling of the spark plugs is reduced thereby improving fuel economy. Also, since crankcase gases are not allowed to build up, the performance life of the lubricating oil is extended, reducing the risk of undue engine wear caused by degraded oil performance.

The foregoing description of the presently preferred embodiment has been provided for the purposes of illustration only. It can be appreciated by one of ordinary skill in the art that modifications could be undertaken without departing from the spirit or scope of the invention disclosed.

I claim:

1. A positive crankcase ventilation valve comprising:
   a housing having an inlet adapted to be connected to the crankcase of an internal combustion engine and an outlet adapted to be connected to the intake manifold of the same engine;
   a two stage check valve in said housing, operating in response to engine load as represented by engine throttle position and the pressure differential between the crankcase and intake manifold, for permitting a limited flow of gas from said inlet to said outlet when the engine is under relatively light loads regardless of the pressure differential and for permitting a relatively large quantity of gas to flow from said inlet to said outlet when the engine is under relatively high loads, where said relatively large gas flow is related to the pressure differential between said crankcase and intake manifold.

2. The valve of claim 1 wherein the first stage of said two stage check valve is selectively operable to limit the flow of gases from said inlet to said outlet in response to the load upon the engine.

3. The valve of claim 2 wherein said first and second stages of said two stage check valve are operable to permit both limited and relatively large quantities of gas to flow from said inlet to said outlet in response to the pressure differential between said crankcase and intake manifold.

4. A valve for regulating the ventilation of gases from the crankcase of an internal combustion engine, said valve comprising:
   an intake orifice;
   first and second valve disks operable to selectively occlude the flow or gases through said intake orifice, said first disk disposed between said second disk and said orifice, said first disk having at least one vent through which gases can flow;
   vacuum forces created by the internal combustion engine such that an idling vacuum force is created when the combustive activity of the engine remains low and an acceleration vacuum force, less than said idling vacuum force, is created when the combustive activity increases, said vacuum forces acting upon said first and second disks to urge said disks away from said intake orifice to allow gases to flow freely through said intake orifice;
   a variable force means for counteracting said vacuum forces, said variable force means acting upon said first and second disks to urge said disks toward said intake orifice to occlude the flow of gases through said intake orifice, such that said disks occlude the flow of gases through said intake orifice to a greater degree when said acceleration vacuum force is present and such that said disks occlude the flow of gases through said intake orifice to a lesser degree when said idling vacuum force is present; and
   an overriding force means, acting upon said first disk, for overriding the effect of said vacuum forces with respect to said first disk by holding said first disk against said orifice while said vacuum forces act upon said second disk to urge said second disk away from said first disk and away from said orifice allowing said crankcase gases to flow through said at least one vent in said first disk.

5. The valve of claim 4 wherein said overriding force means is responsive to said engine combustion activity, and wherein a partially occluded flow of crankcase gases flow through said intake orifice and through said at least one vent in said first disk and past said second disk as said second disk is urged away from said first disk and said orifice by said vacuum forces when said overriding force means overrides the effect of said vacuum forces with respect to said first disk responsive to a low level of combustion activity, and wherein a free flow of crankcase gases flow through said intake orifice past said first and second disks as said disks are urged away from said orifice by said vacuum forces when said overriding force means does not override the effect of said vacuum forces with respect to said first disk responsive to a high level of combustion activity.

6. The valve of claim 5 wherein the combustion rate of the engine is regulated by a throttle and wherein said selectively actuated overriding force means is actuated to override the effects of said vacuum forces when said idling vacuum force is present and said throttle is in a low position.

7. The valve of claim 4 wherein said overriding force means comprises a solenoid.

8. The valve of claim 4 wherein said variable force means comprises a spring.

9. A positive crankcase ventilation valve for an internal combustion engine comprising:
   a housing having intake and exhaust orifices;
   first and second disks for selectively occluding said intake orifice, where said first disk has a plurality of vents about its surface and where said first disk contacts said orifice, and where said second disk is adapted to contact said first disk;
   a guide rod about which said second disk can travel and about which said first disk is affixed;
   a first spring for resisting the travel of said second disk along said guide rod away from said intake orifice and a second spring for resisting the movement of said first disk and said guide rod away from said intake orifice where engine vacuum forces act to urge said first and second disks against said upper and lower tensioning springs and away from said intake orifice; and
   a selective overriding means for selectively holding said guide rod in a fixed position such that said first disk is held in contact with said intake orifice, where said selective overriding means holds said first disk against said intake orifice whenever the engine is idling at a low speed.

10. The positive crankcase ventilation valve of claim 9 wherein when the engine is idling at a low speed and said selective override means is holding said first disk in contact with said intake orifice, the engine vacuum forces act upon said second disk and urge said second disk away from said first disk and said orifice against said resistance of said first spring so as to allow crankcase gases to flow through said vents in said first disk to provide for a partially occluded flow of gases through said intake orifice.

11. The method for regulating the flow of gases from the crankcase of an internal combustion engine, the method including:
   generating vacuum forces as a result of combustion in the engine where a first vacuum force is generated when the rate of combustion is constant and low and where a second, lesser vacuum force is generated when the rate of combustion increases;
   monitoring the combustion rate of the engine;
   interrupting the flow of gases from the crankcase by interposing first and second occluding means, said first occluding means selectively occluding the flow of gases in response to said generated vacuum forces and said monitored combustion rate, and said second occluding means selectively occluding the flow of gases in response to said generated vacuum forces but not in response to said monitored combustion rate;
   allowing an idling flow of gases from the crankcase when said first vacuum force is present and a lower, constant rate of combustion is present by forcibly occluding said first occluding means and allowing said second occluding means to respond to said generated vacuum forces; and
   allowing an acceleration flow of gases from the crankcase when said second vacuum force is present or when a higher, constant rate of combustion is present by allowing said first and second occluding means to respond to said generated vacuum forces.

12. The method of claim 11 wherein the combustion rate of the engine is selectively increased and decreased using a throttle and wherein the step of monitoring the combustion rate of the engine includes determining the position of said throttle.

13. The method of claim 12 wherein the position of said throttle is determined using a signal provided by a control device wherein said control device controls the combustive activity of the engine.

14. The method of claim 12 wherein the position of said throttle is determined using a signal provided by a position sensing means mechanically linked to said throttle.

* * * * *

UNITED STATES PATENT AND TRADEMARK OFFICE
CERTIFICATE OF CORRECTION

PATENT NO. : 5,228,424
DATED : July 20, 1993
INVENTOR(S) : Gregorio S. Collins

It is certified that error appears in the above-indentified patent and that said Letters Patent is hereby corrected as shown below:

Column 4, line 28, "the" (second occurrence) should be -- and --.

Column 6, line 30, "or" should be -- of --.

Column 8, line 5, "The" should be -- A --.

Signed and Sealed this

Fifteenth Day of March, 1994

Attest:

BRUCE LEHMAN

*Attesting Officer*     *Commissioner of Patents and Trademarks*